June 5, 1928.

H. G. KNODERER 1,672,683

OUTLET OR JUNCTION BOX

Filed June 4, 1921

Inventor:
Homer G. Knoderer,
by Albert G. Davis
His Attorney

Patented June 5, 1928.

1,672,683

UNITED STATES PATENT OFFICE.

HOMER G. KNODERER, OF ENGLEWOOD, NEW JERSEY, ASSIGNOR TO GENERAL ELECTRIC COMPANY, A CORPORATION OF NEW YORK.

OUTLET OR JUNCTION BOX.

Application filed June 4, 1921. Serial No. 474,994.

The present invention relates to interior electric house wiring and more especially junction and outlet boxes for use in connection with the wiring conduits.

In order to provide an effective protecting housing for the electric conductors within a house, it is the practice to install a system of metal pipes or conduits in the walls, ceilings and floors from the point of entrance of the service wires to the various outlets or points of attachment of the translating or switching devices to the service circuit. At the points where the wires are to branch from each other, the conduit pipes open through the side walls or bottoms of junction boxes, and at outlet points they open through the sides of outlet boxes. After the conduit pipes and the various junction and outlet boxes have been rigidly installed, the insulated conductor wires are drawn therein by skilled wiremen and the various joints soldered and taped. The box covers are then connected and the walls and ceilings plastered or otherwise finished.

This invention has for its object the provision of an improved junction or outlet box having simple connection means between the cover and body portions whereby they go together with a snap action; whereby all loose parts or parts requiring to be separately operated are dispensed with, and whereby the body portion of the box is relieved of projecting ears or lugs or other obstacles to the manipulations incident to drawing in and connecting of the conductor wires.

Figure 1:
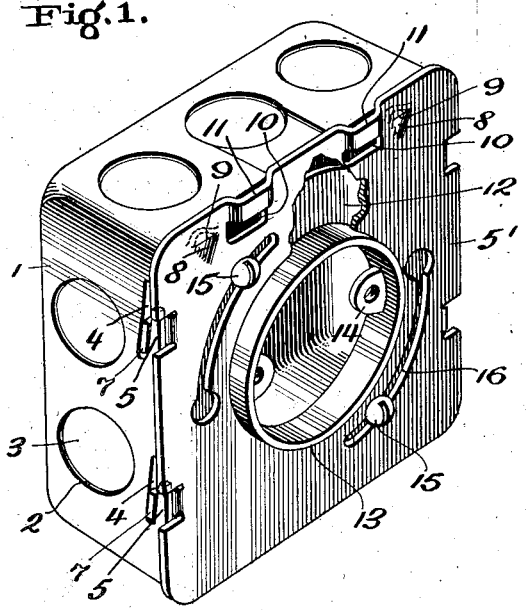
Figure 2:
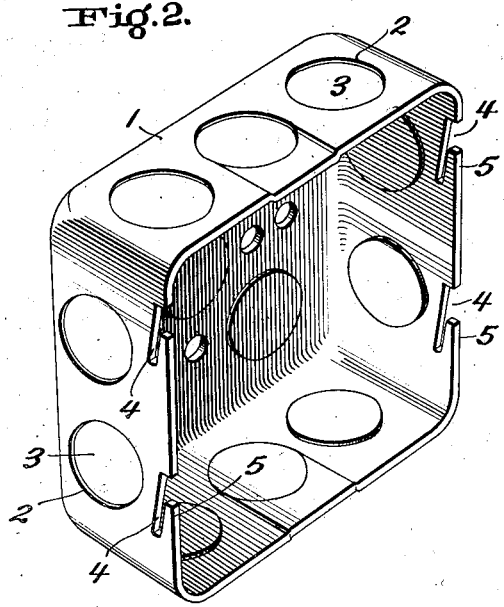
Figure 3:
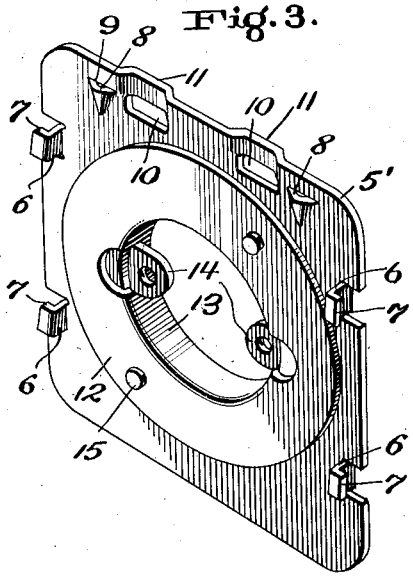

One embodiment of my invention is illustrated in the accompanying drawing in which:

Fig. 1 is a perspective view of a complete outlet box with a portion shown broken away; Fig. 2 is a similar view of the body portion of the box; Fig. 3 is a matched view of the cover, and Figs. 4 and 5 show sectional details.

The body portion 1 of the box is, in general respects, a standard article of commerce, struck up without joints from sheet iron and provided in each side wall and bottom with conduit openings 2 temporarily closed by punched plugs 3 which may be displaced as desired by a slight hammer blow. In the end walls, adjacent their front edges, are cut cam slots 4 whereby are formed holding fingers 5 having a length somewhat greater than the mouth of the slot and having their rear edges pitched or inclined at an acute angle to the front edges of the side walls.

The cover 5' consists of a flat slab of sheet metal of a size slightly greater than the outside dimensions of the body. At the opposite end edges are struck up L-shaped lugs 6 of a width to enter the mouths of cam slots 4 with a clearance and having their toes 7 pitched slightly to correspond with the pitch of the cam slots so that when the cover 5 is placed upon the body 1 with the lugs 6 entered in the cam slots 4, a slight downward movement of the cover serves to secure it firmly in place against the edges of the body walls.

Figure 4:
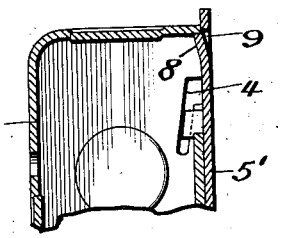
Figure 5:
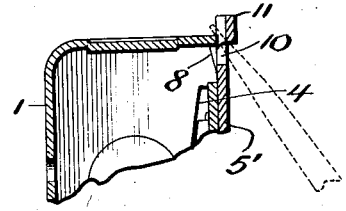

In order to retain the cover in engaged position, it is provided with two spurs 8, made by depressing the metal adjacent the inner side of a transverse slit 9, so that when the cover is moved downward to engaging position the spurs ride over the edge of the upper side wall and deflect the cover slightly until they pass free thereof whereupon the cover recovers from its deflection and snaps the abrupt shoulders of the spurs 8 into locking position inside the upper wall as shown in Fig. 4.

While I have shown the parts of the box provided with two pairs of cam slots 4 and engaging lugs 7, it is to be understood that in those cases where no great weight is to be carried by the cover a single pair of slots and lugs will be sufficient.

In order to facilitate removal of the cover, it is provided adjacent the spurs 8 with two small openings 10 and the bridges 11 thereby formed between the openings and the edge of the cover are struck up slightly so that a pointed tool, such as a screw driver, may be inserted as indicated in Fig. 5 and the cover pried outwardly and upwardly. When restoring the cover to locking engagement with the body member, it may be forced home by inserting the tool through openings 10 and prying against the inner surface of the top wall.

In order to permit a switch or fixture carried by an outlet box cover to be adjusted relative to the box to correct any defect in positioning of the latter, the former is fitted with a swivelled ring plate 12 with a crown flange 13 standing in a circular aperture in the cover and having struck up therefrom two radial ears 14 to which the switch or fixture may be attached. The plate 12 is adapted to be secured in adjusted position by clamping screws 15 threaded therein and with their heads adapted to engage the cover plate adjacent arcuate slots 16 formed therein.

While I have shown and described herein but a single embodiment of my invention, I do not desire to restrict myself thereto.

What I claim as new and desire to secure by Letters Patent of the United States is:—

In an outlet or junction box, the combination of a body member having cover-engaging means, and a flexible cover member provided with body-engaging means, a shouldered projection on the inside of said cover adapted to be sprung over an edge of the box member and to engage the same with a snap action, and a bridge arranged adjacent said projection to permit disconnection of the cover from the body portion.

In witness whereof I have hereunto set my hand this 1st day of June, 1921.

HOMER G. KNODERER.